US008310539B2

(12) United States Patent
Zhao et al.

(10) Patent No.: US 8,310,539 B2
(45) Date of Patent: Nov. 13, 2012

(54) CALIBRATION METHOD AND CALIBRATION DEVICE

(75) Inventors: Bingyan Zhao, West Sacramento, CA (US); Xiaodong Tian, West Sacramento, CA (US); Zhe Jin, West Sacramento, CA (US); Vijay Srivatsan, West Sacramento, CA (US)

(73) Assignee: Mori Seiki Co., Ltd, Nara (JP)

( * ) Notice: Subject to any disclaimer, the term of this patent is extended or adjusted under 35 U.S.C. 154(b) by 593 days.

(21) Appl. No.: 12/475,252

(22) Filed: May 29, 2009

(65) Prior Publication Data

US 2010/0302366 A1    Dec. 2, 2010

(51) Int. Cl.
*H04N 7/18*     (2006.01)
*H04N 17/00*    (2006.01)
*G06K 9/00*     (2006.01)
*G06F 19/00*    (2011.01)

(52) U.S. Cl. ......... 348/142; 348/187; 382/154; 700/245
(58) Field of Classification Search ........................ None
See application file for complete search history.

(56) References Cited

U.S. PATENT DOCUMENTS

| 7,532,949 B2 * | 5/2009 | Ban et al. ...................... 700/245 |
| 2004/0172164 A1 * | 9/2004 | Habibi et al. ................. 700/245 |
| 2008/0292131 A1 * | 11/2008 | Takemoto et al. ............ 382/100 |

FOREIGN PATENT DOCUMENTS

JP     2005-250628 A     9/2005

* cited by examiner

*Primary Examiner* — Wen-Tai Lin
(74) *Attorney, Agent, or Firm* — Smith Patent Office (57) ABSTRACT

The calibration device 1 is set up in a machine tool 50 and provides: a image capture subject material 10 having a calibration pattern 14 that includes one feature point and being attached to the spindle 55, two-dimensional coordinate calculation parts 22, 23 that calculate the two-dimensional coordinates of feature points based on the two-dimensional image data that is created from the images of the calibration pattern 14 that were captured at multiple movement positions of the spindle 55 by the CCD camera 58; a three-dimensional coordinate calculation part 24 that calculates the three-dimensional coordinates of the feature points that correspond to each movement position of the spindle 55; and a parameter calculation part 26 that calculates the intrinsic parameters and extrinsic parameters of the CCD camera 58 based on the two-dimensional coordinates and three-dimensional coordinates at each movement position of the spindle 55.

4 Claims, 6 Drawing Sheets

| Image number | Two-dimensional coordinates of feature point P | Three-dimensional coordinates of feature point P |
|---|---|---|
| 1 | $(u_1, v_1)$ | $(x_1, y_1, z_1)$ |
| 2 | $(u_2, v_2)$ | $(x_2, y_2, z_2)$ |
| 3 | $(u_3, v_3)$ | $(x_3, y_3, z_3)$ |
| 4 | $(u_4, v_4)$ | $(x_4, y_4, z_4)$ |
| 5 | $(u_5, v_5)$ | $(x_5, y_5, z_5)$ |
| 6 | $(u_6, v_6)$ | $(x_6, y_6, z_6)$ |
| ⋮ | ⋮ | ⋮ |

CALIBRATION METHOD AND CALIBRATION DEVICE

TECHNICAL FIELD

The present invention relates to a calibration method and a calibration device wherein the intrinsic and extrinsic parameters of a means for capturing images are calculated on a machine tool that has an attached image capture apparatus that captures images of a preconfigured subject and creates two-dimensional data.

BACKGROUND ART

Recently, in the field of machine tools, machine tools are equipped with CCD cameras that capture the image of a given subject (for example, workpieces, fixtures, tables, tools, etc), create two-dimensional data, and, based on the two-dimensional data created through these CCD cameras, carry out actions such as three-dimensional measurement, creating three-dimensional data, confirming correct setup of workpieces and checking for tool and workpiece collision.

Thus, in order to carry out the above processes at a high level of accuracy, a calibration process must be conducted, to find accurate camera parameters for the CCD camera in advance. Moreover, camera parameters have intrinsic parameters, which are parameters inherent to the camera, and extrinsic parameters, which show the camera's location and position in the global coordinate system.

In order to find these camera parameters, conventionally, a calibration board that has checkered calibration pattern on its top surface is usually used, and the invention proposed in this document is a different type than the conventional calibration method, which uses this checkered calibration pattern.

An example of this process is: capturing the image of the calibration pattern of the calibration board with the CCD camera, creating two-dimensional data, and based on the created two-dimensional data, extracting the lattice points of the checkered pattern, which are the feature points of the calibration pattern, and calculating the two-dimensional coordinates. The intrinsic and extrinsic parameters are calculated based on the calculated two-dimensional coordinates of the lattice points, and the three-dimensional coordinates (three-dimensional coordinates in the global coordinate system) of said lattice points that occur in the predefined space of placement of the calibration boards. Moreover, the calibration pattern's image must be captured from many different directions by changing the placement of the calibration board.

Additional information about the above calibration method is shown in other documents such as Japanese Unexamined Patent Application Publication No. 2005-250628.

SUMMARY OF INVENTION

Technical Problem

The calibration method above, however, has the following problems. Namely, the operator must know the three-dimensional coordinates of the calibration pattern's lattice points in the machine tool coordinate system in advance, place the calibration board so that the three-dimensional coordinates of said lattice points are in given coordinates, and after the calibration board has been placed, measure the three-dimensional coordinates of said lattice points. There is a limit to the accuracy with which the operator can place the calibration board and the accuracy with which the three-dimensional coordinates of the lattice points can be measured, so the intrinsic parameters and extrinsic parameters cannot be calculated precisely. Furthermore, placing the calibration board in fixed positions and measuring the three-dimensional coordinates of said lattice points is extremely complicated.

Furthermore, placing the calibration board accurately in the machine and accurately measuring the three-dimensional coordinates of each lattice point after the calibration board has been placed in the machine are difficult, so the CCD camera's intrinsic parameters and extrinsic parameters are also calculated using the following method. First, the CCD camera's intrinsic parameters are calculated based on the two-dimensional coordinates of the lattice points calculated from the two-dimensional image data of the calibration pattern and the three-dimensional coordinates of each of said lattice points that are in the calibration board's coordinate system. Next, the CCD camera captures the image of several parts of the structure that makes up the machine tool as feature points, and the two-dimensional coordinates is calculated for all points. Then, the extrinsic parameters of the CCD camera are calculated based on the two-dimensional coordinates that were calculated, and the three-dimensional coordinates of each of said feature points in the machine tool coordinate system. However, when this method is used, it is impossible to calculate the intrinsic parameters and extrinsic parameters in one step.

Additionally, the inside of a machine tool is not very bright, so the two-dimensional image data obtained by capturing the image of the calibration board attached to the aforementioned machine contains a lot of noise, and this noise makes it difficult to extract each of said lattice points accurately. Due to reasons such as these, the intrinsic and extrinsic parameters cannot be calculated accurately.

An additional problem is that when said lattice points are numerous, the calibration pattern becomes complicated, and moreover the position of each lattice point must be configured accurately, so creating the calibration board becomes expensive.

This invention takes the above issues into consideration, and uses a simple calibration pattern. The goal of the invention in this application is providing a calibration method and a calibration device that can simply and accurately calibrate in a short amount of time.

Solution to Problem

In order to achieve the above goal, the present invention relates to a calibration method for calculating intrinsic parameters and extrinsic parameters of image capturing means, for a machine tool, the machine tool including:

a moving body;

a feed structure for driving and moving said moving body;

a control device for controlling the movement of said feed structure; and image capturing means being provided to the machine tool, for capturing an image of a preconfigured subject, and creating the two-dimensional image data, the calibration method, comprising:

a mounting process wherein an image capture subject material that has a calibration pattern, including one feature point is mounted on said moving body;

an image-capture process wherein said feed structure moves said moving body, and said image capturing means captures images of said calibration pattern at several movement positions, and creates two-dimensional image data;

a two dimension coordinate calculation process wherein, based on the two-dimensional image data of the calibration pattern that was created by said image-capture process for each movement position of said moving body, said feature points on each two-dimensional image are extracted and the two-dimensional coordinates are calculated;

a three dimension coordinate calculation process wherein said control device sends the movement positions of said moving body when said calibration pattern images were captured by said image-capture process, and based on the received movement positions and the location of said feature points for said moving body, the three-dimensional coordinates for each feature point that corresponds to each movement position of said moving body are calculated; and a parameter calculation process wherein said image capturing means' intrinsic and extrinsic parameters are calculated based on the two-dimensional coordinates and three-dimensional coordinates for each movement position of said moving body that were calculated by both said two dimension coordinate calculation process and the three dimension coordinate calculation process.

The calibration method can be implemented favorably through the following calibration device.

Namely, this calibration device is a calibration device for calculating intrinsic parameters and extrinsic parameters of image capturing means, provided in a machine tool, the machine tool including:

a moving body;

a feed structure for driving and moving said moving body;

a control device for controlling the movement of said feed structure; and image capturing means being provided to the machine tool, for capturing an image of a preconfigured subject, and creating the two-dimensional image data, the calibration device, comprising:

an image capture subject material that has a calibration pattern including one feature point and is mounted onto the moving body, the calibration pattern, the images of which are captured by said image capturing means at several movement positions of the moving body;

two-dimensional coordinate calculation means wherein, based on the two-dimensional image data that was created from the images of said calibration pattern captured by said image capturing means at several movement positions of the moving body, said feature points in each two-dimensional image are extracted, and the two-dimensional coordinates are calculated;

three-dimensional coordinate calculation means wherein said control device sends the movement positions of said moving body when said calibration pattern images were captured by said image capturing means, and based on the received movement positions and the location of said feature points for said moving body, the three-dimensional coordinates for each feature point that corresponds to each movement position of said moving body are calculated; and parameter calculation means wherein, based on the two-dimensional coordinates and three-dimensional coordinates for each movement position of said moving body that were each calculated by said two-dimensional coordinate calculation means and three-dimensional coordinate calculation means, the intrinsic parameters and extrinsic parameters of said image capturing means are calculated.

According to this calibration device, first the image capture subject material is attached to the moving body. This image capture subject material has a calibration pattern that includes one feature point. Moreover, if the machine tool is a machining center, an example of the moving body could be the spindle or the table, and if the machine tool is a lathe, an example of the moving body could be a turret, but the moving body is not limited to these examples in particular.

Next, the feed structure moves the moving body, and at the same time images of the calibration pattern are captured by the image calibration means in several movement positions of the moving body and two-dimensional data is created. Moreover, capturing the image of the calibration pattern at each movement position where the moving body is moved to multiple movement positions can be done so that the movement of the moving body and image capture with the image capture means are controlled by the control device based on the NC program. In addition, the movement positions of the moving body when the image of the calibration pattern is captured by the image capture means is transmitted from the control device to the three-dimensional coordinate calculation means.

After that, the two-dimensional coordinate calculation means extracts the feature points from each two-dimensional image and calculates the two-dimensional coordinates based on the two-dimensional image data created after the images of the calibration pattern were captured at multiple movement positions of the moving body with the image capture means; while the movement positions of the moving body from when the image of the calibration pattern was captured by the image capture means are sent, and the three-dimensional coordinate calculation means calculates the three-dimensional coordinates of said feature points that correspond to each movement position of the moving body based on the position of said feature point for received movement positions and the moving body. Moreover, if, for example, the moving body is the spindle for attaching a tool, the position of said feature points in respect to the moving body is defined by the offset amount in the spindle axis line direction between the tip of the spindle and the feature point. Furthermore, the coordinate system of the two-dimensional coordinates is the coordinate system that was configured in the two-dimensional image, so the three-dimensional coordinate system is the coordinate system that was configured in the machine tool.

Then, the parameter calculation means calculates the intrinsic parameters and extrinsic parameters of the image capture means based on the two-dimensional coordinates and three-dimensional coordinates of each movement position for the moving body that were calculated respectively by the two-dimensional coordinate calculation means and the three-dimensional coordinate calculation means. Moreover, examples of said intrinsic parameters can be given such as principal point coordinates, scale factors, distortion of the space between two axes of the image; examples of said extrinsic parameters are the position and orientation of the image capture means in the machine's coordinate system, etc., but the parameters are not limited to these examples.

In this fashion, depending on the calibration method and the calibration device related to the invention, the image capture subject material is attached to the moving body, so by moving the moving body, the position of the image capture subject material (feature point) can be changed easily. Also, position information for the moving body is obtained from the control device, so the three-dimensional coordinates of the feature point can be accurately verified and due to this the intrinsic parameters and extrinsic parameters can be found very accurately. In addition, there is no need to measure three-dimensional coordinates of the feature point, like in prior art.

Furthermore, accurate three-dimensional coordinates of the feature points can be recognized in the machine coordinate system, so both the intrinsic parameter and the extrinsic parameters can be calculated in one step and it is more efficient. In addition, there is only one feature point, so the calibration pattern is simpler, and the manufacturing cost of the image capture subject material can be reduced.

In addition, when the image capture subject material is moved to a great number of movement positions, and the calibration pattern's image is captured at each position, it takes a great deal of time and effort for operators to do it themselves, but if an NC program is followed and it controls the movement of the moving body and the image capturing of the image capture means, the movement of the image capture subject material and capturing the image of the calibration pattern can be done automatically. Consequently, all the operator has to do is run said program and the image capture mean's intrinsic parameters and extrinsic parameters can be calculated even more easily.

Moreover, the calibration pattern comprises a first graphic which includes said feature point, and a second graphic which is placed so it surrounds the outside of the first graphic and has a center point that matches said feature point. Said two-dimensional coordinate calculation means can be structured from: a first calculation part that extracts said second graphic from each of the two-dimensional images and calculates the center coordinates based on the two-dimensional image data that was created when the images of said calibration pattern were captured at the multiple movement positions of said moving body via said image capturing means; and a second calculation part that configures an area that includes the center coordinate of said second graphic on each of the two-dimensional images based on the center coordinates of said second graphic which was calculated by said first calculation part, extracts said feature points from within the configured area, and calculates the two-dimensional coordinates.

If using this method, first, the second graphic is extracted from the two-dimensional image based on the two-dimensional image data of the calibration pattern that was created by the image capture means, and after the center coordinates are calculated by using the first calculation part, an area including the center coordinates of the second graphic is configured on the two-dimensional image based on these calculated center coordinates of the second graphic, and said feature point is extracted from the center of the configured image and the two-dimensional coordinates are calculated by the second calculation part.

The reason it is done this way is because it is difficult to extract feature points of the calibration pattern accurately from the created two-dimensional image data because it is not very bright inside the machine tool that has an image capture means and a image capture subject material set up inside it, so there is a lot of noise in the two-dimensional images that are obtained through capturing the image of the calibration pattern. That is why, as explained above, if, after finding the center coordinate of the second graphic, the feature points are extracted from this area that includes this center point coordinate, and the two-dimensional coordinates are found, it is possible to accurately extract the feature point and precisely find the two-dimensional coordinates. Through this, the intrinsic and extrinsic parameters can be calculated accurately.

Furthermore, the structure can be made so said image capture subject material is attached in place of a tool in said moving body which holds a tool, or so said image capture subject material is attached in place of a rotating tool in said moving body that holds a rotating tool and said feature point is positioned on the same straight line as the axis line of the rotation tool that is held in said moving body.

If done in this manner, the tool change apparatus or the operators themselves can easily and accurately attach the image capture subject material to the moving body. In addition, grasping the positional relationship between the moving body and the feature point is simpler and more accurate. Consequently, the intrinsic and extrinsic parameters can be calculated more accurately. Furthermore, the setup time needed to attach the image capture subject material can be reduced. Moreover, if the image capture subject material is attached to the moving body that holds a rotating tool, the feature point is made so it can be positioned on the rotation tools axis line is because the position of the feature point will not change regardless of the installation angle of the image capture subject material is attached.

Advantageous Effects of Invention

As in the above, the calibration method and the calibration device related to the present invention use a simple calibration pattern, and allow accurate and simple calibration processing in a short amount of time.

DESCRIPTION OF EMBODIMENT

Figure 1:
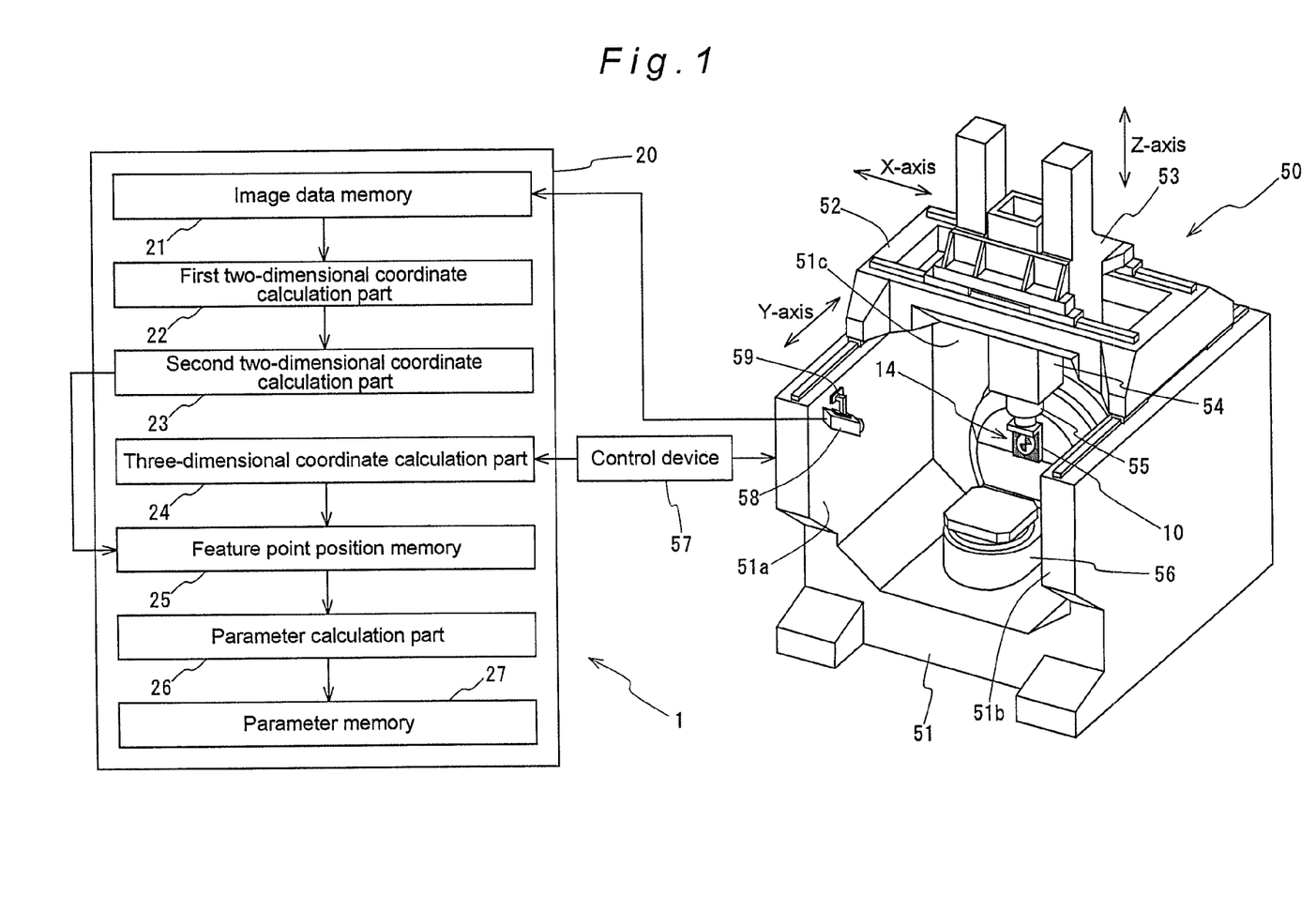
FIG. 1 is a block diagram that shows an outline of the structure of the calibration device concerning an example of the present invention.
Figure 2:
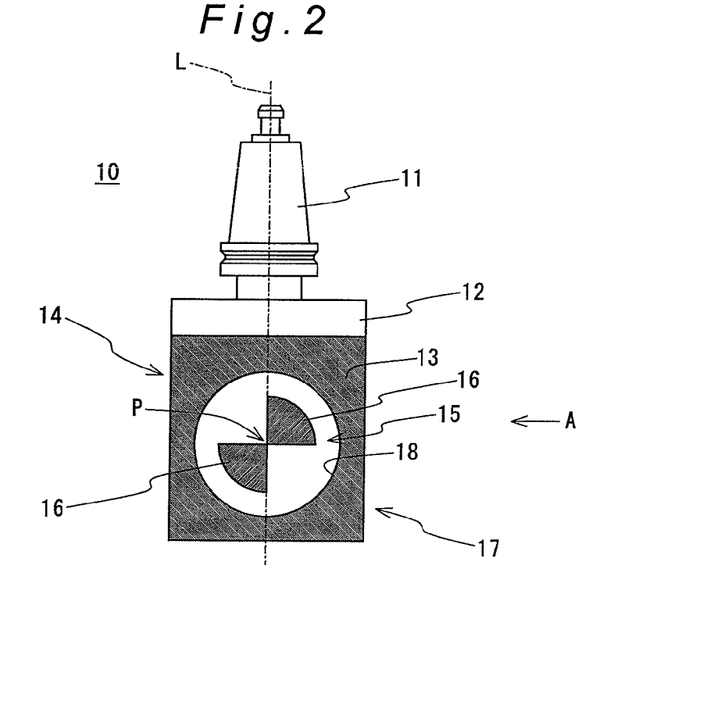
FIG. 2 is a side view that shows an outline of the structure of the image capture subject material related to this embodiment.
Figure 3:
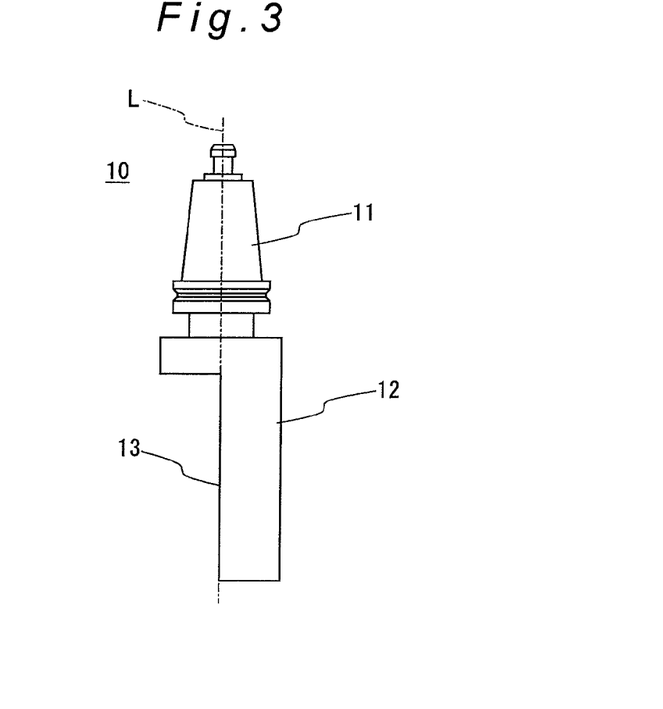
FIG. 3 is a side view of reference arrow A's direction in FIG. 2.

Henceforth, a concrete embodiment of the present invention is explained based on the attached drawings. Moreover, FIG. 1 is a block drawing that shows the outline of the structure of the calibration device related to this particular embodiment of the present invention. FIG. 2 is a side view that shows the structural outline of the image capture subject material related to this embodiment. FIG. 3 is a side-view drawing of the reference arrow A's direction in FIG. 2.

As shown in FIG. 1, the calibration device 1 in this example is installed in a machine tool 50, which is called a machining center; and comprises the image capture subject material 10, which has a calibration pattern 14 that includes one feature point P, and a data processing device 20 that calculates the intrinsic parameters and extrinsic parameters of the CCD camera 58 based on the two-dimensional, grayscale image data that was obtained from said CCD camera 58.

First, said machine tool 50 is explained. This machine tool 50 is equipped with a bed 51; a freely-movable first saddle 52 on the direction that moves forward and back on the horizontal surface (Y-axis direction) placed on bed 51; a second saddle 53 that moves freely to in left and right directions (X-axis direction) on the horizontal surface placed above the first saddle 52; a spindle head 54 that moves freely in the vertical direction (Z-axis direction) supported by the second saddle 53; a spindle 55 that rotates freely in the axis line parallel to the Z axis and in the axis line center, has a rotating tool (not shown) attached to the lower end, and is supported by spindle head 54; a rotating drive structure (not shown) that rotates spindle 55 in the axis line center; a table 56 where workpieces (not shown) are placed on the upper surface, and is placed on the bed 51; a Y-axis feed structure (not shown), an X-axis feed structure (not shown), and a Z-axis feed structure (not shown) that moves the first saddle 52, the second saddle 53, and the spindle head 54 in their respective movement directions and a control device 57 that controls the movement of said rotating drive structure and each axis feed structure.

Said bed 51 has a structure that is made up of side walls 51a, 51b, 51c on the left, right and inside, and said first saddle 52 is provided on both the left and right sides of the side walls 51a and 51b, and said table 56 is provided on the inner back wall.

Furthermore, in said machine tool 50 said CCD camera 58 is installed through a bracket 59 on the upper part of the bed's 51 right wall 51a; This CCD camera 58 captures the image of the preconfigured subject (for example, a workpiece, fixture, table 56 and a tool, etc.) and creates two-dimensional grayscale image data, and is set so it outputs the created two-dimensional, grayscale output data to the outside.

Next, said calibration device 1 will be explained. This calibration device 1, as described above, is made up of said image capture subject material 10 and a data processing device 20, and said data processing device 20 comprises a computer, and provides a image data memory 21, the first two-dimensional coordinate calculation part 22, the second two-dimensional coordinate calculation part 23, the three-dimensional coordination calculation part 24, the feature point position memory 25, the parameter calculation part 26 and the parameter memory 27. Moreover, said first two-dimensional calculation part 22 and second two-dimensional calculation part 23 function as the two-dimensional coordinate calculation means mentioned in the Claims.

Said image capture subject material 10 is made up of the attached part 11 that is attached to the spindle 55, and a block-shaped material 12 that has a two-dimensional surface 13 including the axis line of the spindle 55 when the attached part 11 was attached to spindle 55. Said calibration pattern 14 is configured on a two-dimensional surface 13. This calibration pattern 14 comprises the first graphic 15, which includes said feature point P, and the second graphic 17, which includes a circular shape 18 that is placed so it surrounds the outside of the first graphic 15. The center point of the circular shape 18 matches said feature point P. Said first graphic 15 is made up of a graphic 16 which combines two fan shapes that are black and configured to be symmetric about a point, and the center point of the symmetry is said feature point P. Furthermore, said second graphic 17 is made up of a graphic where the inside of circular shape 18 is white and the outside is black.

Moreover, aforementioned feature point P is on the axis line of spindle 55 when said attached part 11 is attached to spindle 55. Namely, it is on the same straight line L as the axis line of the rotating tool that is attached to spindle 55, and it is configured so that it can be positioned at a point only separated from the tip of spindle 55 by a given distance. Furthermore, image capture subject material 10 is attached to spindle 55, and for example said second saddle 53 moves along the X direction because it was made to move in the X direction, the CCD camera 58 would capture images of said calibration pattern 14 at multiple movement positions along that X direction, and the two-dimensional grayscale image data would be created. Furthermore said control device 57 is set up so that it sends the movement positions in the X-axis direction, Y-axis direction, and Z-axis direction of said spindle head 54 (spindle 55) when the images of the calibration pattern 14 are captured by the CCD camera 58 to the data processing device 20.

Said image data memory 21 contains the two-dimensional grayscale image data that was created when the images of the calibration pattern 14 were captured by the CCD camera 58 in several movement positions for the image capture subject material 10 in the X-axis direction.

Figure 4:
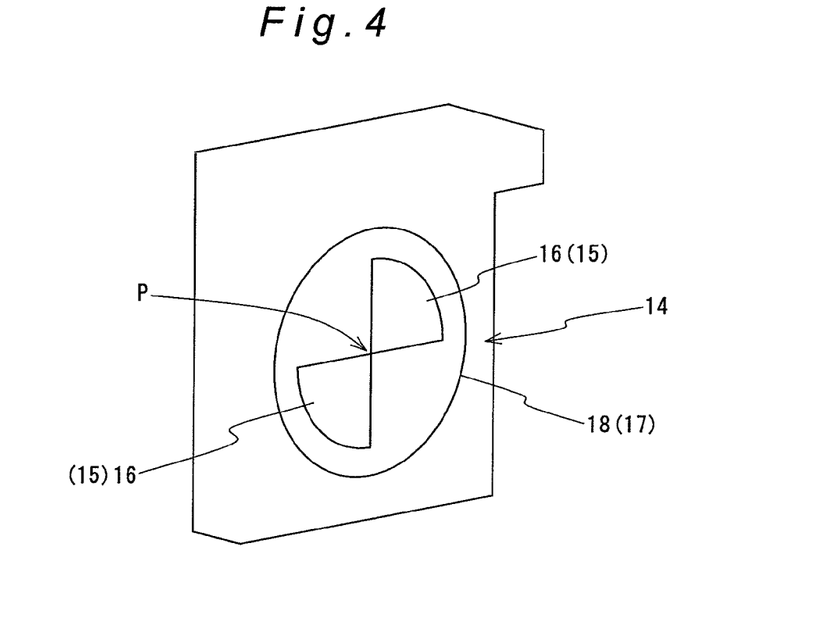
FIG. 4 is an explanatory drawing to explain the process in the first two-dimensional coordinate calculation part of this embodiment.

Said first two-dimensional coordinate calculating part 22 extracts said second graphic 17 and circular shape 18 and calculates the center coordinates for each based on the two-dimensional grayscale image data of calibration pattern 14 in each movement position of image capture subject material 10 that is stored in said image data memory 21. Moreover, the method for extracting circular shape 18 is not limited to this, but as one example, as in FIG. 4, an example method can be given wherein, the two-dimensional grayscale image data is made binary with a threshold value and, based on that binary image data, contour lines that are equivalent to said circular shape 18 are extracted. Furthermore, FIG. 4 shows the contour shapes of said block material 12, the first graphic 15, and the second graphic 17, not the binary image itself.

Figure 5:
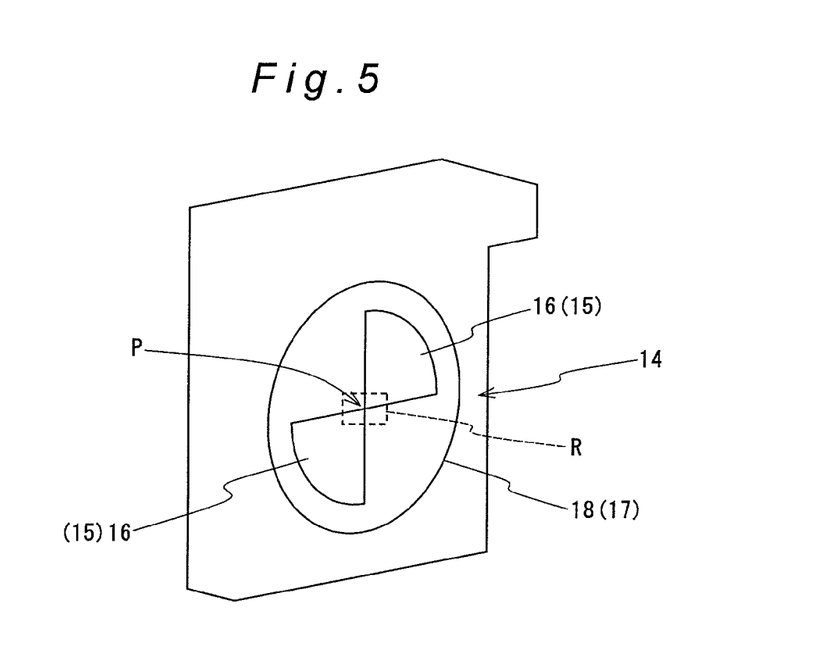
FIG. 5 is an explanatory drawing to explain the process that occurs in the second two-dimensional coordinate calculation part of this embodiment.

Said second two-dimensional coordinate calculation part 23 configures area R, which, as shown in FIG. 5, includes the center coordinates of circular shape 18 in each two-dimensional image, based on the center coordinates for circular shape 18 that were calculated by the first two-dimensional coordinate calculation part 22; said feature point P is extracted from within the configured area R and those two-dimensional coordinates are calculated and the calculated two-dimensional coordinates are stored in said feature point position memory 25. Moreover, a method for extracting feature point P is given, and while not necessarily limited to this, a similar example is a method wherein the contour lines of said fan-shaped graphic 16 are extracted from said binary image data and the intersection of the contour lines is extracted, based on the extracted contour lines. Furthermore, FIG. 5, like FIG. 4, is not the binary image itself, but a figure showing said block shaped material 12, the first graphic 15 and the contour shape of the second graphic 17. In addition, the coordinate system of the two-dimensional coordinates is the coordinate system that was configured in the two-dimensional image.

Said three-dimensional coordinate calculation part 24 calculates the three-dimensional coordinates of feature point P that correspond to each axis position received based on the position of said feature point P in respect to spindle 55 and each movement position from said control device 57, which sends the movement positions in the X-axis direction, Y-axis direction, and Z-axis direction of said spindle head 54 (spindle 55) when the CCD camera 58 captures images of the calibration pattern 14; and then the calculated three-dimensional coordinates are stored in said feature point position memory 25. Moreover, the coordinate system for the three-dimensional coordinates is the coordinate system configured for the machine tool 50. Furthermore, the position of feature point P in respect to the spindle 55 is, for example, entered and configured by the operator in advance, based on the feature point P's distance from the tip of the spindle.

Figure 6:
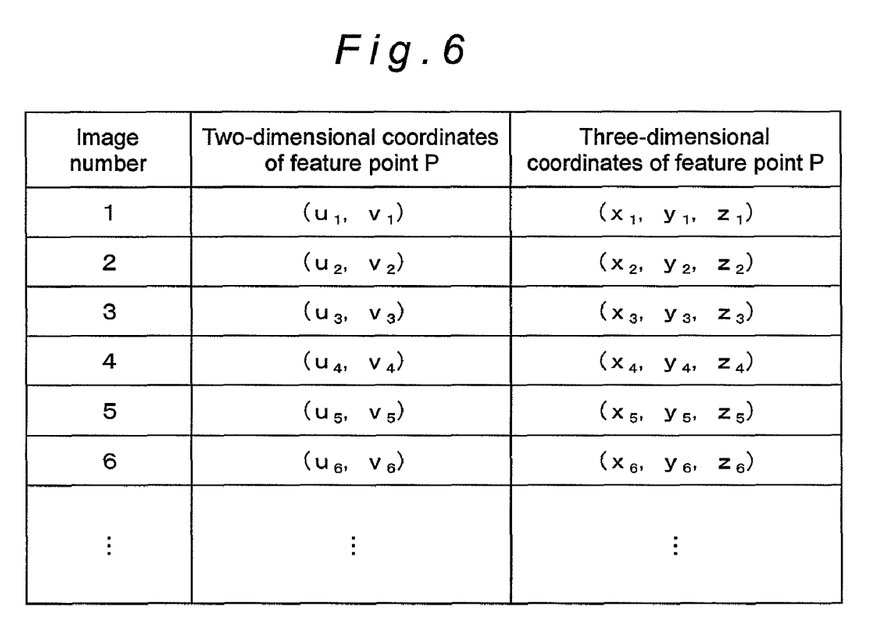
FIG. 6 is an explanatory drawing that shows the data structure of the data contained in the feature point memory of this embodiment.

Said feature point position memory 25 stores the feature point's two-dimensional and three-dimensional coordinates that were calculated by said two-dimensional coordinate calculation part 23, and the three-dimensional coordinate calculation part 24, and, as shown in FIG. 6, the sequentially created calibration pattern's 14 image number, two-dimensional coordinates for feature point P and three-dimensional coordinates for feature point P are linked and stored.

Said parameter calculation part 26 calculates the parameters based on two-dimensional coordinates and three-dimensional coordinates of feature point P that are stored in said feature point position memory 25. Concretely, parameter calculation part 26 uses multiple combinations of two-dimensional coordinates and three-dimensional coordinates that have a mutually corresponding relationship, calculates the intrinsic parameters and extrinsic parameters of said CCD camera 58, and stores the calculated intrinsic parameters and extrinsic parameters in said parameter memory 27. Moreover, in the past, there have been various types of methods proposed for the method of calculating the intrinsic parameters and extrinsic parameters by using multiple combinations of two-dimensional coordinates and three-dimensional coordinates for the feature point P, and the method applied does not mater. Furthermore, examples of said intrinsic parameters can be given as principal point coordinates, scale factors, distortion of the space between two axes of the image. For the extrinsic parameters the examples can be given as parallel movement vectors that express the position of CCD camera 58 in the machine tool 50 coordinate system (global coordinate system), the rotation array that similarly, expresses the position of CCD camera 58 in the machine tool 50 coordinate system, etc.

Then, said CCD camera's 58 intrinsic parameters and extrinsic parameters are configured based on the data stored in said parameter memory 27.

In the example of the calibration device 1 that is structured as above, first, a tool change apparatus or the operators themselves attach image capture subject material 10 to spindle 55. Moreover, feature point P is positioned on the axis line of the spindle 55, so the position of feature point P will not change due to the installation angle of image capture subject material 10.

Next, the X-axis feed structure moves the second saddle 53, and the image capture subject material 10 moves in the X direction; the CCD camera 58 captures images of the calibration pattern 14 and two-dimensional grayscale images are created, and the created two-dimensional grayscale image data is stored in the image data memory 21. Moreover, the movement positions of the spindle head 54 (spindle 55) when CCD camera 58 captured the images of the calibration pattern 14 are sent to the three-dimensional coordinate calculation part 24 by control device 57.

Afterward, the first two-dimensional coordinate calculation part 22 calculates the center coordinates of the second graphic's 17 circular shape 18 in each two-dimensional image based on the each two-dimensional grayscale image stored in the image data memory 21; next, based on the calculated center coordinates of the circular shape 18, the second two-dimensional coordinate calculation part 23 configures area R, which includes the center coordinates of the circular shape 18 on each two-dimensional image, extracts the feature point P from the middle of area R, and calculates its two-dimensional coordinates. Then the calculated two dimensional coordinates are stored in the feature point position memory 25.

Furthermore, the three-dimensional coordinate calculation part 24 receives the movement positions of the spindle head 54 in the X direction, Y direction, and Z direction when the CCD camera 58 captures images of the calibration pattern 14 from the control device 57, and calculates the three-dimensional coordinates for the feature point P that correspond to each received movement position, based on each movement position received and the position of feature point P in respect to the spindle 55. The calculated three-dimensional coordinates are stored in the feature point position memory 25.

Then, the parameter calculation part 26 calculates the intrinsic parameters and extrinsic parameters of CCD camera 58 based on the mutually corresponding two-dimensional coordinates and the three-dimensional coordinates that are stored in the feature point position memory 25; the calculated intrinsic parameters and extrinsic parameters are stored in the parameter memory 27.

In the example of the calibration device 1 that is structured as above, the image capture subject material 10 is attached to the spindle 55, so the position of the image capture subject material 10 (feature point P) can be changed easily, and the image capture subject material 10 can be attached to the spindle 55 simply and accurately. In addition, the relationship between the spindle 55 and the feature point P can be grasped easily. Furthermore, obtaining position information of the spindle 55 from the control device 57 is simple, so the three-dimensional coordinates of feature point P can be recognized accurately. As a result, the intrinsic parameters and extrinsic parameters can be found with high accuracy.

Furthermore, feature point P's accurate three-dimensional coordinates can be recognized in the machine tool's coordinate system, so this is efficient because the intrinsic parameters and extrinsic parameters can be calculated in one step. In addition, the image capture subject material 10 only needs to be attached to the spindle 55, so the setup time needed can be greatly reduced. Furthermore, there is only one feature point P, which makes the calibration pattern 14 very simple, and as a result, the cost of manufacturing the image capture subject material can be greatly reduced. In addition, the calibration pattern 14 is configured on a two-dimensional surface 13, so manufacturing the image capture subject material can be simplified.

Furthermore, in the present example, the calibration pattern 14 comprises the first graphic 15, which includes feature point P, and the second graphic 17 that includes a circular shape 18, which is placed so it surrounds the outside of the first graphic 15, and the center of the circular shape 18 matches feature point P; and when calculating the feature point P's two-dimensional coordinates from the two dimensional image of the calibration pattern 14, first the circular shape 18 is extracted from the second graphic 17 and its center coordinates are calculated, and after configuring area R that includes the calculated center coordinate, feature point P is extracted from area R and the two dimensional coordinates are calculated. This is due to the difficultly of accurately extracting feature point P from the calibration image 14 because of the large amount of noise in the two-dimensional grayscale image data obtained from capturing the image of the calibration pattern 14 caused by the darkness inside of the machine tool 50 where the CCD camera 58 and image capture subject material 10 are installed.

Consequently, if as in the above method, after the extraction area of feature point P has been narrowed, feature point P can be extracted, so the correct feature point P can be extracted and the two-dimensional coordinates can be found accurately. As a result, the intrinsic parameters and extrinsic parameters can be extracted and the two-dimensional coordinates can be found very accurately. Moreover, the reason that the center coordinate of the circular shape 18 is not made the two-dimensional coordinates of feature point P is that the calculated center coordinates of the circular shape 18 does not match the two-dimensional coordinates of the feature point P with high accuracy.

An embodiment of the present invention was explained above, but the concrete form of the present invention is not limited to these.

Figure 7:
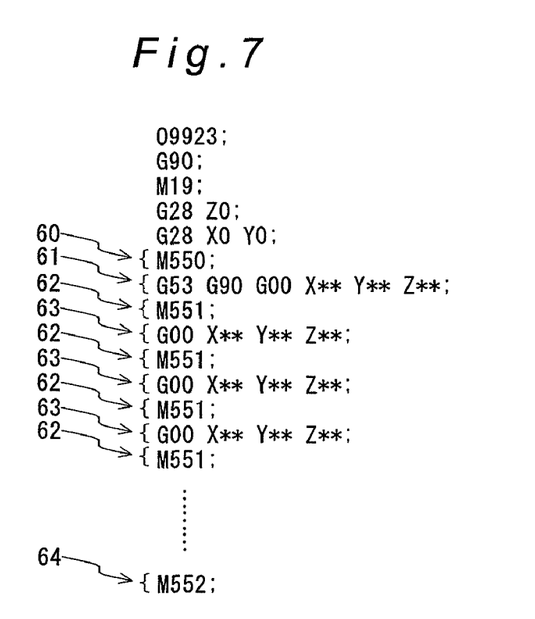
FIG. 7 is an explanatory figure that shows an example of an NC program when the image capture subject material is moved to the next given position in steps.

For example, the image capture subject material 10 can be moved to several movement positions, and the CCD camera 58 captures the image of the calibration pattern 14. After image capture, the parameter calculation part 26 can be made so that the process that calculates the intrinsic parameters and extrinsic parameters of the CCD camera 58 are based on a NC program. FIG. 7 shows an example of such an NC program. At this time, said control device 57 controls at least said CCD camera 58, each feed structure, and the parameter calculation part 26.

As shown in FIG. 7, this NC program includes a initialization command 60 that initializes the CCD camera 58, a movement command 61 that moves the spindle 55 to the first movement position via each feed structure, an image capture command 62 that captures the image of the calibration pattern 14 on the image capture subject material 10 and generates the two-dimensional grayscale image data, a movement command 63 that moves the spindle 55 to a different movement position via each feed structure, and a calculation command 64 that calculates the intrinsic parameters and the extrinsic parameters for the CCD camera 58 via the parameter calculation part 26. The movement command 63 and the image capture command 60 are alternated repeatedly so that it is possible to capture images of the calibration pattern 14 in several positions. The NC program is configured so that the operations are executed in the order of said initialization command 60, movement command 61, image capture command 62, movement command 63, image capture command 62, movement command 63, image capture command 62 . . . , and calculation command 64.

Then, when the control device 57 runs the NC program, each feed structure moves the spindle 55 to given movement positions in order, the CCD camera 58 captures images of the calibration pattern 14 in each movement position, and the two-dimensional grayscale image data is created for each and stored in the image data memory 21. When two-dimensional, grayscale images are stored in the image data memory 21, each two-dimensional coordinate calculation part 22, 23 calculates the two-dimensional coordinates of the feature point P and stores them in the feature point position memory 25. Meanwhile, the three-dimensional coordinate calculation part 24 receives the movement positions of the spindle 55 for when the CCD camera 58 captured images of the calibration pattern 14, and then it calculates the three-dimensional coordinates for the feature point P and stores the coordinates in the feature point position memory 25.

Then, when the spindle 55 is moved to all of the movement positions and the images of the calibration pattern 14 are captured at each movement position, the NC program's final block (calculation command 64) is run, and the parameter calculation part 26 calculates the intrinsic parameters and extrinsic parameters for the CCD camera 58 based on the data stored in the feature point position memory 25, and then stores them in the parameter memory 27.

If the operators were to do the operations themselves, when the image capture subject material 10 is moved to a great number of movement positions and the image of the calibration pattern 14 is captured at each movement position, it would take a great amount of time and effort, but if the spindle's 55 movements and the CCD camera 58 image capture is controlled by the NC program as in this example, the movement of the image capture subject material 10 and the capturing the image of the calibration pattern 14 can be done automatically. Consequently, the operator only has to run the aforementioned NC program, and the CCD camera's 58 intrinsic parameters and extrinsic parameters can be calculated even more easily.

Furthermore, in the above example the type of machine tool that was given as an example was a type of machine tool 50 called a machining center, but said calibration device 1 can be applied to a lathe as well. In this case, the image capture subject material should be attached to the turret.

Furthermore, said image capture subject material 10, is not limited to the structure above. For example, feature point P does not have to be positioned on the axis line of the spindle 55, but in this case, there is the inconvenience of the position of feature point P changing according to the installation angle of the image capture subject material 10 in respect to the spindle 55. For example, if said calibration device 1 was set up in a machine tool with a table that could not move, the image capture subject material 10 can be attached to that table.

Figure 8:
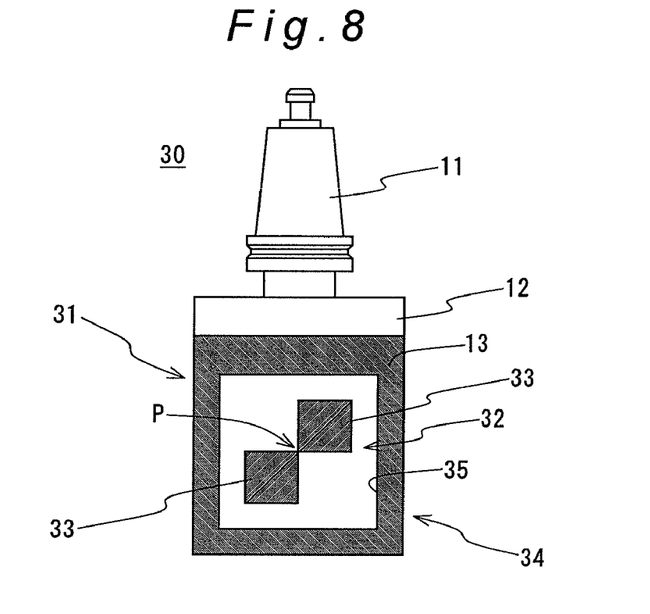
FIG. 8 is a front-view figure that shows the image capture subject material related to a different embodiment of the present invention.
Figure 9:
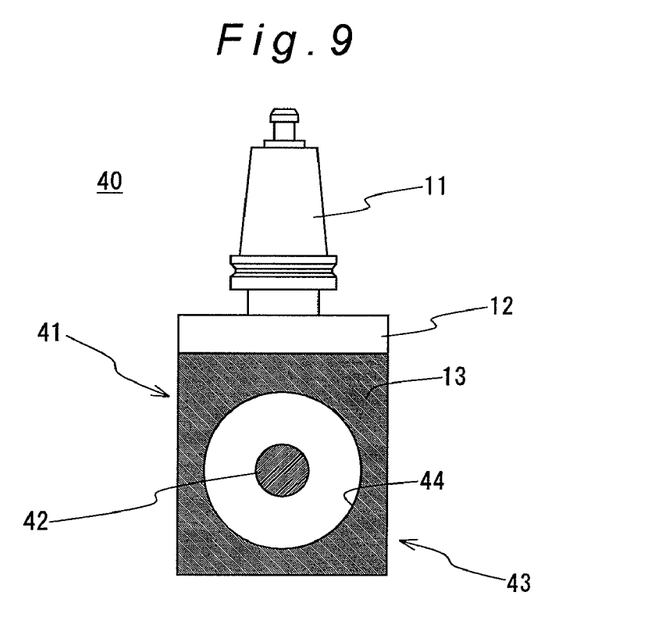
FIG. 9 is a front-view drawing that shows the image capture subject material related to a different embodiment of the present invention.
Figure 10:
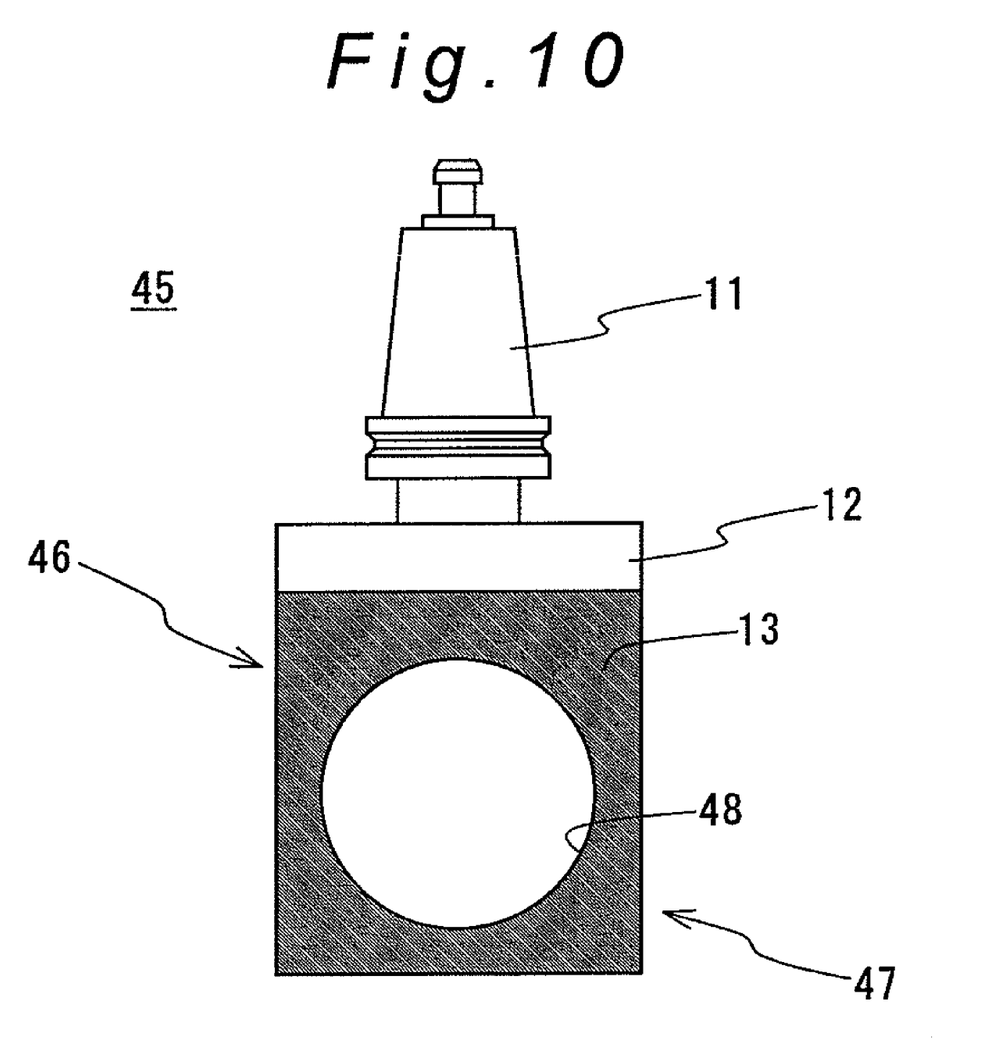
FIG. 10 is a front-view drawing that shows the image capture subject material related to a different embodiment of the present invention.

Furthermore, said image capture subject material 10 can be structured like image capture subject materials 30, 40, 45 as shown in FIGS. 8 through 10. Moreover, in the following explanation, the structural parts that are the same as the structure in said image capture subject material 10 have the same symbols and are omitted from the detailed explanation.

As shown in FIG. 8, calibration pattern 31 is configured on said image capture subject material 30, and comprises the first graphic 32 that includes one feature point P and the second graphic 34 that includes the rectangular shape 35 which is placed so it surrounds the outside of the first graphic 32. The center of square shape 35 matches said feature point P. Said first graphic 32 is structured so it combines with two rectangular and monochrome graphics 33 that are configured to be symmetric with respect to a point. The center of the point of symmetry is feature point P and said second graphic 34 is structured from a white rectangular shape 35 that has a white inside and a black outside.

As shown in FIG. 9, by contrast, calibration pattern 41 is configured on said image capture subject material 40, and it comprises the first graphic 42 that contains one feature point (not pictured), and a second graphic 43 that includes circular shape 44 that is placed so It surrounds the outside of the first graphic 42. The center point of this circular shape 44 matches said feature point (not shown). Said first graphic 42 is composed of a black inner circle and the center point is the feature point (not shown), said second graphic 43 is composed of a graphic where the inside of circular shape 44 is white and the outside is black.

As shown in FIG. 10, the calibration pattern 46 is configured on said image capture subject material 45, and comprises the graphic 47 which includes the circular shape 48. Said graphic 47 is composed of a graphic where the inside of circular shape 48 is white and the outside is black. The center point of this circular shape 48 matches said feature point (not shown). Moreover, if this image capture subject 45 is used, calibration device 1 omits said second two-dimensional coordinate calculation part 23 and the center point coordinates of the circular shape 48, which is calculated by using said first two-dimensional coordinate calculation part 22, are the coordinates of the feature point (not shown).

Furthermore, any of the following aspects that calculate the two-dimensional coordinates of feature point P can be used. Namely, it is acceptable to calculate the two dimensional coordinates of the feature point P with the two-dimensional calculation parts 22, 23 based on the two-dimensional grayscale image data that was created when images of the calibration pattern 14 were captured with the CCD camera 58 after moving the image capture subject material 10 to all of the movement positions, and store the coordinates in the feature point position memory 25. It is also acceptable to capture an image of the calibration pattern 14 with the CCD camera 58 in this movement positions each time the image capture subject material 10 is moved to a movement position, calculate the two-dimensional coordinates of the feature point P by using the two dimensional coordinate calculation methods 22, 23 based the created two-dimensional grayscale image data, and store the coordinates in the feature point position memory 25, and then move the image capture subject material 10 to the next movement position.

REFERENCE SIGNS LIST

1 Calibration device
10 Image capture subject material
14 Calibration pattern
20 Data processing device
21 Image data memory
22 First two-dimensional coordinate calculation part
23 Second two-dimensional coordinate calculation part
24 Three-dimensional coordinate calculation part
25 Feature point position memory
26 Parameter calculation part
27 Parameter memory
50 Machine tool
55 Spindle
57 Control device
58 CCD Camera

CITATION LIST

Patent Literature

Japanese Unexamined Patent Application Publication No. 2005-250628

The invention claimed is:

1. A machine tool calibration method for calculating intrinsic parameters and extrinsic parameters of an image capturing device of a machine tool, the machine tool including:
a moving body;
a feed structure for driving and moving said moving body;
a control device for controlling the movement of said feed structure; and
the image capturing device, the image capturing device being provided to the machine tool for capturing an image of a preconfigured subject, the calibration method, comprising:
a mounting process wherein the preconfigured subject having a calibration pattern, including one feature point, that is mounted on said moving body;
an image-capture process wherein said feed structure moves said moving body, and said image capturing device captures images of said calibration pattern at several movement positions, and creates two-dimensional image data;
a two dimension coordinate calculation process wherein, based on the two-dimensional image data of the calibration pattern that was created by said image-capture process for each movement position of said moving body, each said feature point on each two-dimensional image is extracted and the two-dimensional coordinates are calculated;
a three dimension coordinate calculation process wherein said control device sends the movement positions of said moving body when said calibration pattern images were captured by said image-capture process, and based on received movement positions and locations of each said feature point for said moving body, the three-dimensional coordinates for each feature point that corresponds to each movement position of said moving body are calculated; and
a parameter calculation process wherein the intrinsic and extrinsic parameters are calculated based on the two-dimensional coordinates and the three-dimensional coordinates for each movement position of said moving body that were calculated by both said two dimension coordinate calculation process and the three dimension coordinate calculation process, wherein
said preconfigured subject is mounted in place of a rotating tool in said moving body that holds the rotating tool and said feature point is located on the same straight line as an axis line of the rotating tool which is held in said moving body.

2. The calibration method according to claim 1, wherein at least at said image-capture process, said control device, based on a numerically controlled program, controls said feed structure and said image capturing device so that said feed structure moves said moving body to multiple positions and said image capturing device captures the image of said calibration pattern at each movement position and creates the two-dimensional image data.

3. A calibration device for calculating intrinsic parameters and extrinsic parameters of an image capturing device, provided in a machine tool, the machine tool including:
a moving body;
a feed structure for driving and moving said moving body;
a control device for controlling the movement of said feed structure; and
the image capturing device, the image capturing device being provided to the machine tool for capturing an image of a preconfigured subject, wherein
the preconfigured subject has a calibration pattern including one feature point and is mounted onto the moving body, the images of the calibration pattern are captured by said image capturing device at several movement positions of the moving body and two-dimensional image data are created wherein
the calibration device comprises:
a two-dimensional coordinate calculation device wherein, based on the two-dimensional image data that was created from the images of said calibration pattern captured by said image capturing device at several movement positions of the moving body, each feature point in each two-dimensional image is extracted, and the two-dimensional coordinates are calculated;
a three-dimensional coordinate calculation device wherein said control device sends the movement positions of said moving body when said calibration pattern images were captured by said image capturing device, and based on received movement positions and locations of each said feature point for said moving body, the three-dimensional coordinates for each feature point that corresponds to each movement position of said moving body are calculated; and a parameter calculation device wherein, based on the two-dimensional coordinates and the three-dimensional coordinates for each movement position of said moving body that were each calculated by said two-dimensional coordinate calculation device and the three-dimensional coordinate calculation device, the intrinsic parameters and extrinsic parameters of said image capturing device are calculated, and wherein said preconfigured subject is mounted in place of a rotating tool in said moving body that holds the rotating tool and said feature point is located on the same straight line as an axis line of the rotating tool which is held in said moving body.

4. The calibration device according to claim 3, wherein said calibration pattern comprises a first graphic which includes said feature point, and a second graphic which surrounds the outside of the first graphic and has a center point that matches said feature point, and said two-dimensional coordinate calculation device is configured by: a first calculation part that extracts said second graphic from each of the two-dimensional images and calculates center coordinates, based on the two-dimensional image data that was created when the images of said calibration pattern were captured at the multiple movement positions of said moving body via said image capturing device; and a second calculation part that configures an area that includes the center coordinate of said second graphic on each of the two-dimensional images based on the center coordinates of said second graphic which was calculated by said first calculation part, extracts said feature points from within the configured area, and calculates the two-dimensional coordinates.

* * * * *